(No Model.) 4 Sheets—Sheet 3.

W. & J. C. SWINDELL.
FURNACE.

No. 490,088. Patented Jan. 17, 1893.

WITNESSES:
Dennis D. Wolcott
F. E. Gaither

INVENTORS,
John C. Swindell,
William Swindell,
by George H. Christy
Att'y.

(No Model.) 4 Sheets—Sheet 4.

W. & J. C. SWINDELL.
FURNACE.

No. 490,088. Patented Jan. 17, 1893.

WITNESSES:
Damon S. Wolcott
F. E. Gaither

INVENTORS,
John C. Swindell,
William Swindell,
by George H. Christy
Att'y.

UNITED STATES PATENT OFFICE.

WILLIAM SWINDELL AND JOHN C. SWINDELL, OF ALLEGHENY, PENNSYLVANIA.

FURNACE.

SPECIFICATION forming part of Letters Patent No. 490,088, dated January 17, 1893.

Application filed January 6, 1892. Serial No. 417,152. (No model.)

*To all whom it may concern:*

Be it known that we, WILLIAM SWINDELL and JOHN C. SWINDELL, citizens of the United States, residing at Allegheny, in the county of Allegheny and State of Pennsylvania, have invented or discovered certain new and useful Improvements in Furnaces, of which improvements the following is a specification.

The invention described herein relates to certain improvements in the furnace shown and described in an application filed on or about October 29, 1891, Serial No. 410,195. In said furnace the gas was delivered in a single stream or jet into a central flue whence it flowed into the hearth intermingled with a suitable quantity of air, which was discharged from a circumferential flue in series of jets or streams into the central flue.

The object of the present invention is to provide for the discharge of the gas in a series of jets from a circumferential flue into the central flue, where it commingles with the air similarly discharged into the central flue. And it is a further object of said invention to provide for a cleaning of the several flues and passages of the furnace while in a heated condition by causing air to traverse the flues for the products of combustion and the gas in a direction opposite to that of the normal flow of the gas and products of combustion.

The invention will be hereinafter more fully described and claimed.

Figure 1:
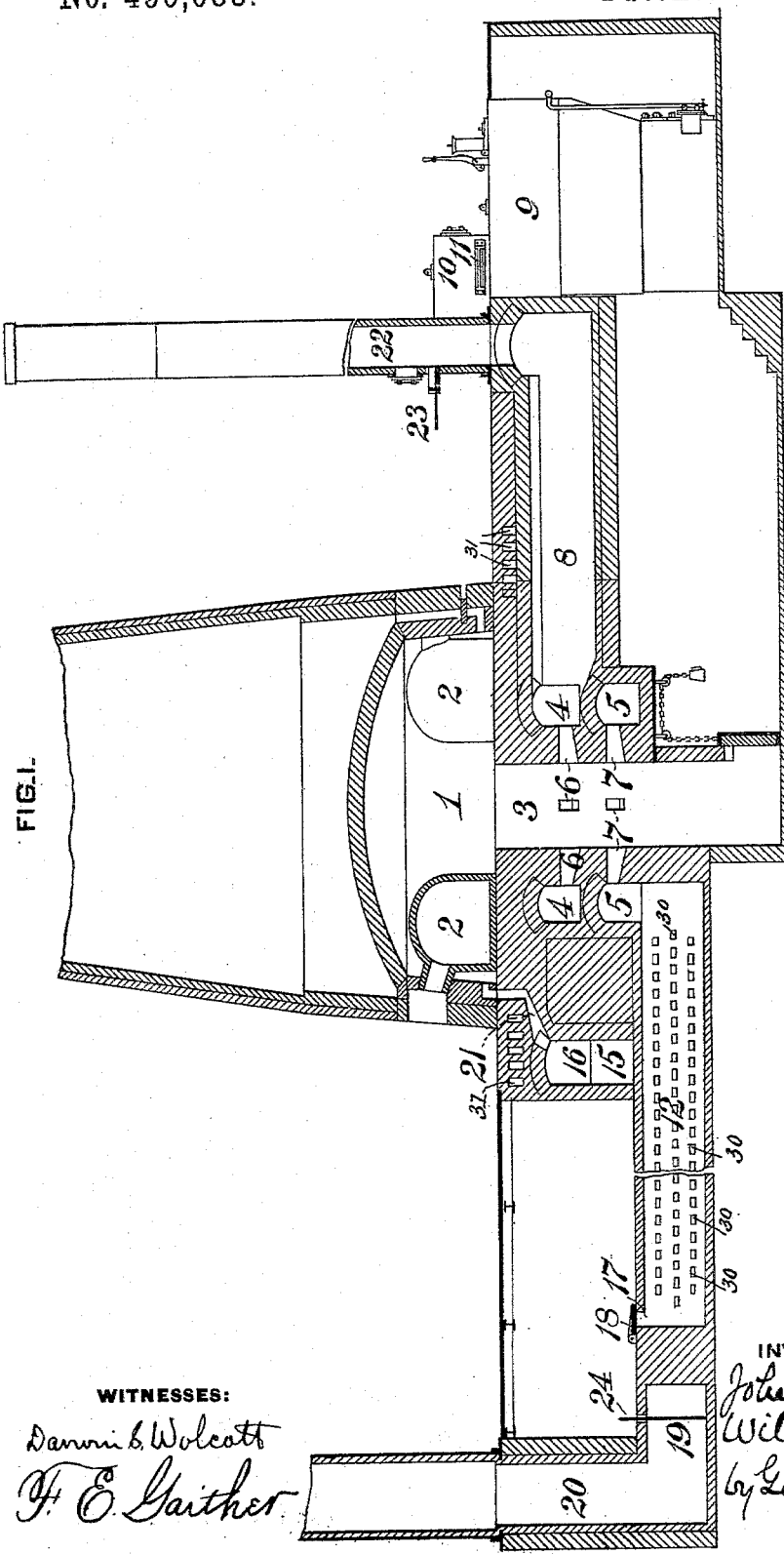
Figure 2:
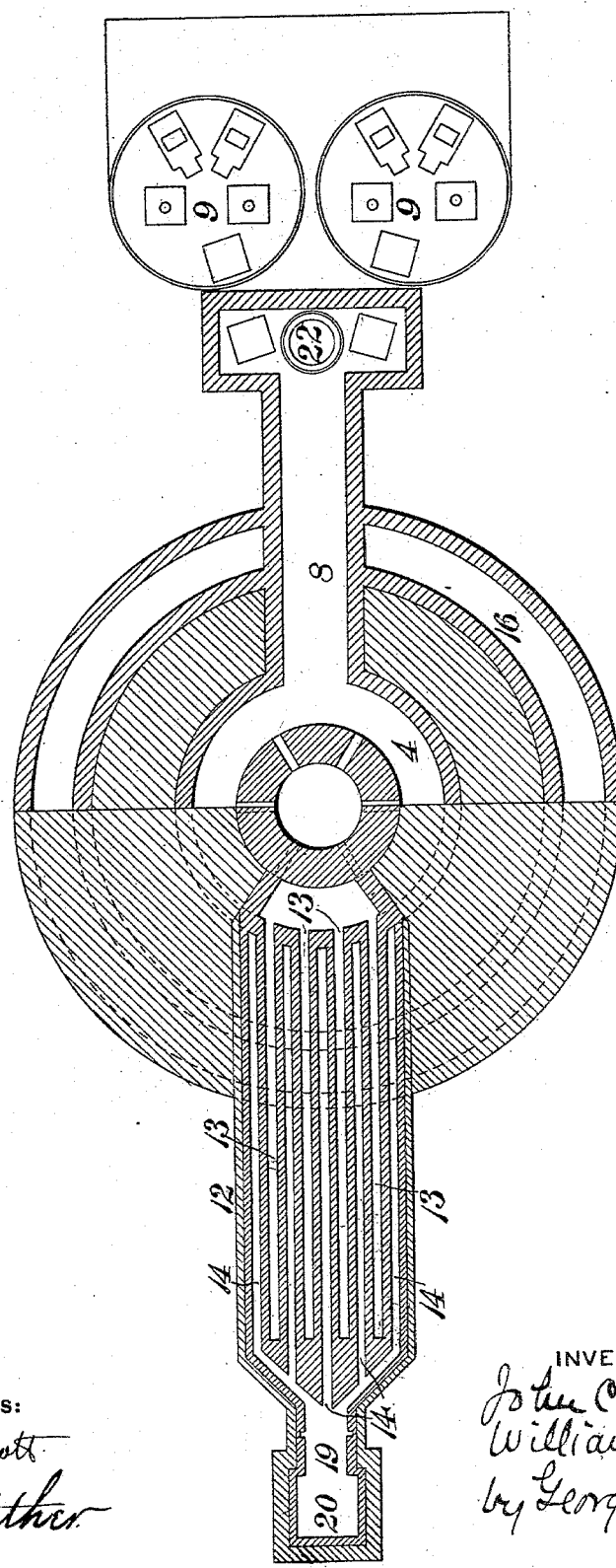
Figure 3:
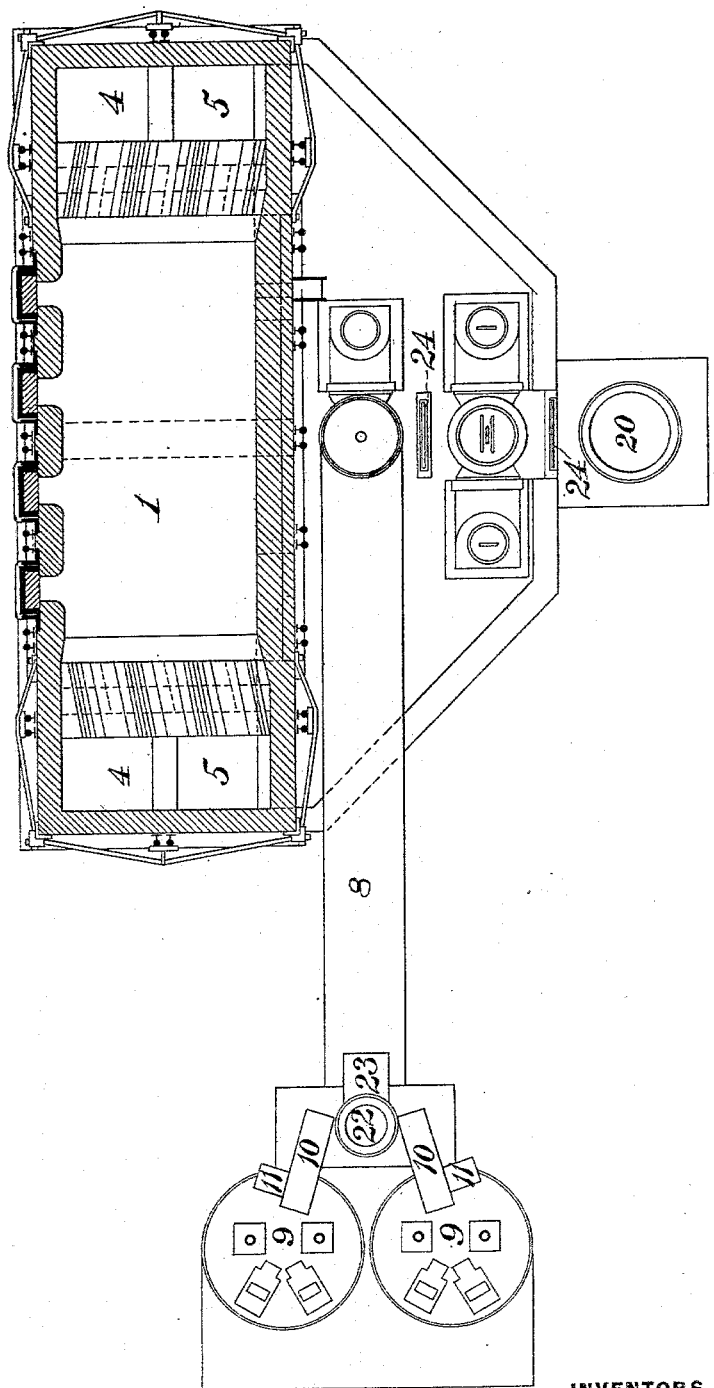
Figure 4:
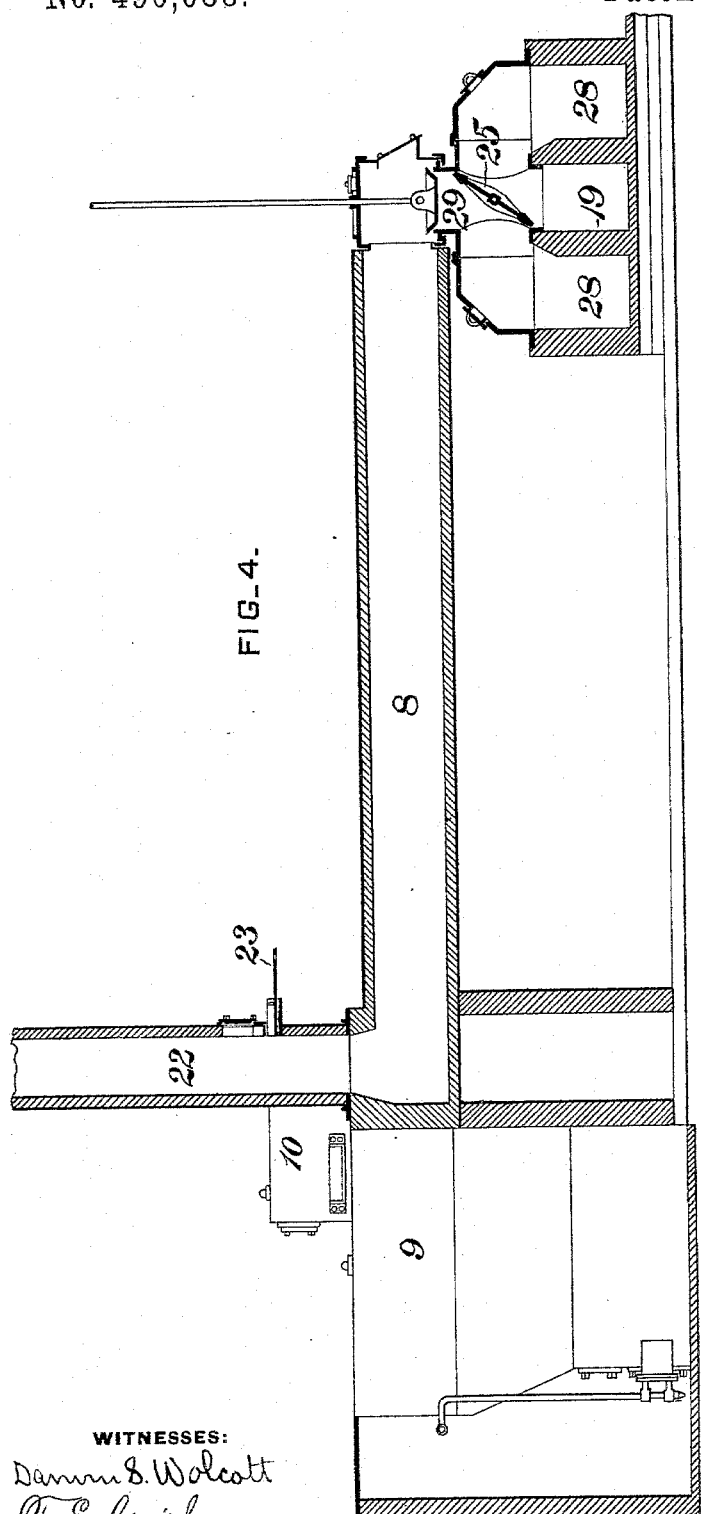
Figure 5:
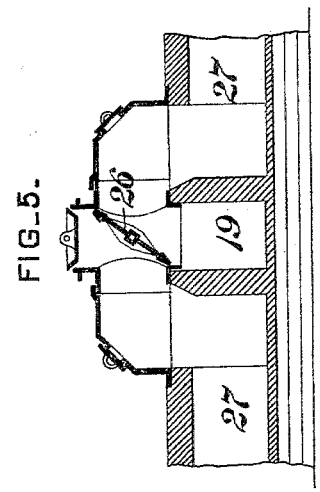

In the accompanying drawings forming a part of this specification, Figure 1 is a sectional elevation, showing our improvement applied to a glass pot furnace; Fig. 2 is a sectional plan view of the same, and; Fig. 3 is a plan view of the common regenerating furnace having our improvement applied thereto. Figs. 4 and 5 are sectional elevations, the planes of section being indicated by the lines $x$, $x$, and $y$, $y$, respectively, in Fig. 3.

In applying our invention to a glass pot furnace, the heating or melting chamber 1 is of the usual or any suitable form, suitable seats for the pots being provided on the hearth and suitable openings being formed through the side wall for the necks of the melting pots 2. At the center of the hearth is formed a vertical flue 3, and outside of this flue 3 are formed annular flues 4 and 5, connected by short radial flues 6 and 7 with the central flue 3. The flue 4 is connected by a horizontal flue 8 with the gas producers 9 by bonnet flues 10, which are provided with valves 11, whereby the flow of gas through the flue 8 can be stopped. The flue 5 which is located below the flue 4 is connected with the regenerating chamber 12, which is provided with a series of passages 13 for the air and a series of alternating passages 14 for the products of combustion which enter said passages from the vertical flue 15, connected at its upper end to the annular flue 16. Air enters the outer ends of the passages 13 through the opening 17, which can be partially or entirely closed by the door 18. The outer ends of the passages 14 connect with a flue 19 leading to the stack 20, said flue being provided with a valve 24, whereby the flow of products of combustion to the stack can be stopped. A series of vertical flues 21 extend from points opposite the seats of the pots 2 down to the annular flue 16, as shown in Fig. 1, and serve as exits for the products of combustion from the heating chamber. In this furnace as in that described in the application hereinbefore referred to, the flow of the gas and air, and the products of combustion is always in the same direction. As also fully set forth in said application, double regenerating chambers through which the air and products of combustion are caused to pass alternately, may be employed.

In order to effect a cleaning of the several flues and passages of the furnace, the gas flue 8 is connected near its outer end with a stack 22, which is provided with a valve 23, whereby the stack may be closed at or near its lower end during the normal operation of the furnace. When it is desired to clean the flues, the valve 24, in the stack flue 20, and the valves 11 in the bonnet flues 10 are closed, and the valve 23 in the stack 22 opened. Thereupon the draft of said stack will cause the air to traverse the regenerative chamber and the flues 5 and 7 to the vertical flue 3, whence it will pass through the flues 6 and 4 into the gas flue 8, where the deposits from the gas in its normal flow, will be consumed, the products of combustion escaping through the stack 22.

The skilled furnace builder having the knowledge imparted by the drawings and foregoing description, will be able to readily devise other arrangements for effecting the reverse traverse of the air as herein described, without departing from the spirit of our invention and apply our invention to other constructions of regenerating furnaces. As for example in Fig. 3, we have shown our improvement applied to the well known double chamber regenerating furnace. As shown the only essential change consists in connecting the gas flue 8 at or near its junction with the producers 9, with a stack 22 provided with a valve 23, which in the normal operation of the furnace is kept closed. The bonnet flues 10 connecting the producer with the gas flue are also provided with valves 11, which are closed when it is desired to clean the gas flue. The flues 11 being closed the valves 24 in the stack flues are closed so as to stop the draft of the stack 20, the reversing valves 25 and 26 in the gas and air flues are placed centrally thereof or in a middle position and the valve 23 opened. The draft of the stack 22 will now cause the air to flow through the air flues 27 and both air regenerating chambers to the hearth of the furnace as in the normal operation of the furnace, and will then be drawn down through the gas regenerating chambers through the gas flues 28, valve chamber 29, and flue 8 to the stack 22. The air in its traverse through all the regenerating chambers will be highly heated, so that as soon as it enters the gas flue the deposits therein will be ignited and quickly burned out.

The small rectangle 30 shown in the regenerating chamber 12, Fig. 1, represents tie bricks by which the adjacent walls of the flues in the regenerating chambers are held together. In the platform adjacent to the furnace is shown a series of flues 31 for the circulation of air, thereby preventing an excessive cooling of the platform.

We claim herein as our invention:

1. As an improvement in the art of operating furnaces, the method herein described of cleansing the same, which consists in causing air to traverse the heated regenerating chambers and pass thence to and through the gas flues, whereby a combustion of the deposits in the gas flues is effected, substantially as set forth.

2. A furnace having in combination a valved connection extending from the gas flue at or near its junction with the producer or other supply to a stack, a valve for stopping the normal draft through the furnace and a valve for stopping the normal flow of gas from the producer or other supply, substantially as set forth.

3. A furnace having in combination therewith a main stack, an auxiliary stack provided with a valve and connected with the gas flue at or near its point of junction with the producer or other gas supply, a valve for stopping the draft through the main track, and a valve for stopping the normal flow of gas from the producer or other supply, substantially as set forth.

4. In a furnace, the combination of a heating chamber, regenerating chambers provided with an air inlet, flues extending from the regenerating chambers to the heating chamber, gas conducting flues having an open connection with the flues from the regenerating chamber and with the heating chamber, and an auxiliary stack having a valved connection with the gas flues for causing the air to traverse the regenerating chambers, the flues extending therefrom and the gas flues, whereby a combustion of the deposits in the gas flues is effected, substantially as set forth.

5. In a furnace, the combination of a heating chamber, gas producers, regenerating chambers provided with an air inlet, inlet and outlet flues for the heating chamber, two annular flues surrounding the inlet flue and connected thereto by a series of radial flues, a flue connecting one of the annular flues with the producers, a flue connecting the other annular flue with the regenerating chambers, an auxiliary stack connected to the gas flue at or near its junction with the producers, a valve controlling the draft through the auxiliary stack a valve for stopping the normal draft through the furnace and a valve for stopping the normal flow of gas from the producer, substantially as set forth.

6. A furnace having in combination a connection extending from the gas flue at or near its junction with the producer or other supply to a stack, a valve for closing such connection, a valve for stopping the normal draft through the furnace and a valve for stopping the normal flow of gas from the producer or other supply, substantially as set forth.

In testimony whereof we have hereunto set our hands.

WILLIAM SWINDELL.
JOHN C. SWINDELL.

Witnesses:
DARWIN S. WOLCOTT,
R. H. WHITTLESEY.